US006426980B1

(12) United States Patent
Gorday et al.

(10) Patent No.: US 6,426,980 B1
(45) Date of Patent: Jul. 30, 2002

(54) METHOD AND APPARATUS FOR COMMUNICATING A CALL

(75) Inventors: Paul Edward Gorday, W. Palm Beach; William Joseph Kuznicki; Clifford Dana Leitch, both of Coral Springs; Thomas Victor D'Amico, Boca Raton, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/411,107

(22) Filed: Oct. 4, 1999

(51) Int. Cl.[7] .............................................. H04L 27/04
(52) U.S. Cl. ...................................... 375/295; 375/316
(58) Field of Search ................................ 375/260, 261, 375/295, 316, 298, 340; 714/762, 787, 761

(56) References Cited

U.S. PATENT DOCUMENTS

| | | | |
|---|---|---|---|
| 4,752,953 A | * | 6/1988 | Piak et al. .................. 380/237 |
| 4,816,783 A | | 3/1989 | Leitch |
| 5,237,320 A | * | 8/1993 | Sato et al. .............. 340/825.44 |
| 5,546,411 A | | 8/1996 | Leitch et al. |
| 5,710,546 A | | 1/1998 | Leitch |
| 5,724,385 A | * | 3/1998 | Levin et al. ................. 375/222 |
| 5,737,326 A | * | 4/1998 | I et al. ......................... 370/335 |
| 5,751,761 A | * | 5/1998 | Gilhousen ................... 370/209 |
| 5,943,361 A | * | 8/1999 | Gilhousne et al. .......... 370/320 |
| 5,949,814 A | * | 9/1999 | Odenwalder et al. ....... 370/260 |
| 5,966,384 A | * | 10/1999 | Felix et al. .................. 370/209 |

\* cited by examiner

Primary Examiner—Tesfaldet Bocure
(74) Attorney, Agent, or Firm—Randi L. Dulaney

(57) ABSTRACT

A wireless communication system (10) employing quadrature amplitude modulation techniques comprises a system controller (22), at least one radio frequency base transmitter (26), and at least one wireless communication device (35). The system controller (22) generates a downlink call (34) for transmission between the radio frequency base transmitter (26) and the wireless communication device (35). Multiplexing an I-channel bit stream (74) comprised of a first set of calls (70) interleaved together and a Q-channel bit stream (80) comprised of a second set of calls (76) interleaved together generates the downlink call (34). One wireless communication device demultiplexes the downlink call (34) and processes the I-channel bit stream (74). Another wireless communication device demultiplexes the downlink call (34) and processes the Q-channel bit stream (80).

27 Claims, 11 Drawing Sheets

I-CHANNEL INTERLEAVING BLOCK
(4QAM)

72

4 QAM INTERLEAVED I-CHANNEL BIT STREAM

74

Q-CHANNEL INTERLEAVING BLOCK
(4QAM)

78

4 QAM INTERLEAVED Q-CHANNEL BIT STREAM

80

4 QAM MULTIPLEXED BIT STREAM

4 QAM COMPLEX SYMBOL STREAM

I-CHANNEL INTERLEAVING BLOCK
(16 QAM)

16 QAM INTERLEAVED I-CHANNEL BIT STREAM

Q-CHANNEL INTERLEAVING BLOCK
(16 QAM)

16 QAM INTERLEAVED Q-CHANNEL BIT STREAM

16 QAM MULTIPLEXED BIT STREAM

16 QAM COMPLEX SYMBOL STREAM

METHOD AND APPARATUS FOR COMMUNICATING A CALL

BACKGROUND OF THE INVENTION

1. Field of the Invention

This invention relates in general to wireless communication systems and in particular to the communication of calls within a wireless communication system.

2. Description of the Related Art

Wireless communication systems today employ a variety of modulation schemes from analog modulation to digital modulation such as binary phase modulation and binary frequency modulation. The type of modulation utilized greatly affects the performance of the wireless communication system. Considerable effort is spent in the optimization of key performance elements such as bandwidth, demodulator performance and error control strategy for overall enhancement of data throughput.

As the available spectrum for wireless communications becomes a premium due to the increasing number of subscribers, more bandwidth efficient transmission methods are required. Recently, designers have demonstrated that multilevel modulation schemes such as multilevel phase shift keying and quadrature amplitude modulation (QAM) provide efficient modulation techniques to meet the performance requirements of the wireless communication systems. Of these, QAM, a bandwidth efficient transmission method, yields the highest potential data throughput by its use of amplitude as well as phase modulation.

QAM is the amplitude modulation and demodulation of two carriers that have the same frequency but are in phase quadrature to each other. It can be either analog or digital. QAM has been shown to be a suitable modulation scheme for wireless communication systems.

Further, variable rate QAM modulation has been found to be an efficient modulation scheme capable of substantial performance gains over conventional QAM. In variable rate QAM modulation, the wireless communication device and the base station transmitter coordinate to determine an optimum modulation rate based on signal conditions and channel loading. The baud rate in such a system is fixed, but multiple modulation levels are allowed (2 QAM, 4 QAM, 16 QAM etc.). QAM transmissions over wireless communication channels are subject to a variety of impairments, including interference, noise, multipath fading, and delay spread. In general, higher modulation levels (16 QAM, 64 QAM, etc.) are less tolerant to these impairments than lower modulation levels (2 QAM or 4 QAM). With variable rate QAM techniques, the modulation level is adapted to the existing channel conditions, usually using the highest modulation level which meets some minimum performance requirements (Bit error rate, packet loss, etc.)

As a further enhancement to conventional variable QAM modulation, a pilot carrier can be transmitted along with the data to provide a reference for coherent demodulation. For a further description of this enhancement, please refer to U.S. Pat. No. 4,816,783 by Leitch, entitled "Method and Apparatus for Quadrature Modulation", and assigned to Motorola Inc. of Schaumburg, Ill., the assignee of the present invention.

The improved system capacity achieved must be balanced with the increased cost of the wireless communication system due to the increased complexity of variable rate QAM modulation techniques. What is needed is a method to reduce the complexity of the implementation of variable rate QAM modulation between the base station transmitters and the wireless communication devices in a wireless communication system.

BRIEF DESCRIPTION IF THE SEVERAL VIEWS OF THE DRAWINGS

DETAILED DESCRIPTION OF THE INVENTION

Figure 1:
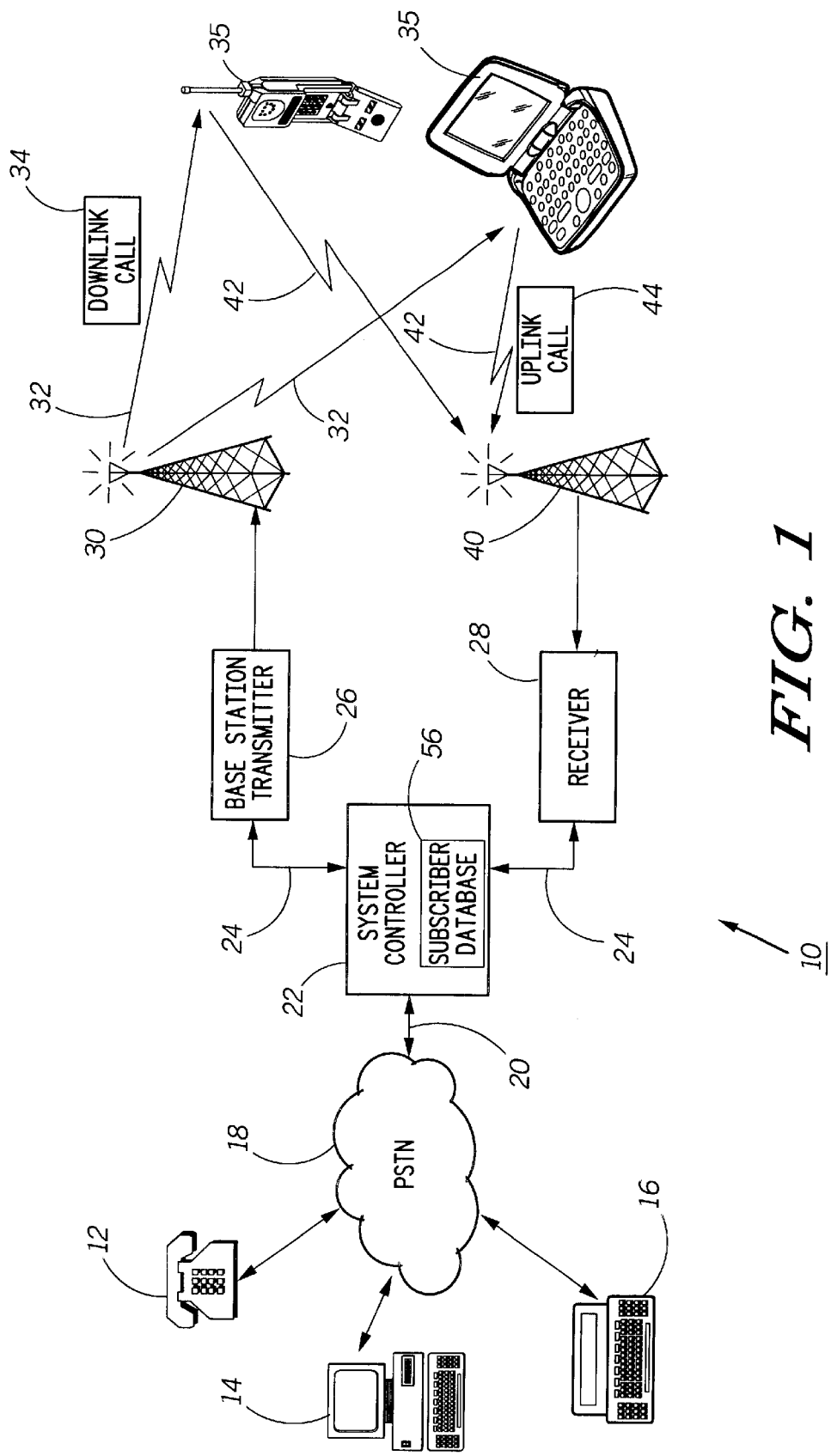
FIG. 1 is an electrical block diagram of a wireless communication system.

Referring to FIG. 1, a block diagram of a wireless communication system 10 is shown. The wireless communication system 10 comprises a message input device, such as a telephone 12, a computer 14, or a desktop messaging unit 16, connected through a conventional public switched telephone network (PSTN) 18 through a plurality of conventional telephone links 20 to a system controller 22. The telephone links 20 may be a plurality of twisted wire pairs, or a multiplexed trunk line.

The system controller 22 is coupled to and oversees the operation of at least one radio frequency base transmitter 26 and, preferably, at least one radio frequency base receiver 28 through one or more communication links 24. The communication links 24 typically are twisted pair telephone wires, and additionally can include radio frequency (RF), microwave, or high quality audio communication links. The radio frequency base transmitter 26 and the radio frequency base receiver 28, which typically are message store and forward stations that encode and decode inbound and outbound telephone addresses into formats that are compatible with landline message switch computers and personal radio telephone addressing requirements, such as cellular message protocols. The system controller 22 can also function to encode and decode wireless messages that are transmitted to or received by the radio frequency base transmitter 26 or the radio frequency base receiver 28. Telephony signals are typically transmitted to and received from the system controller 22 by telephone sets such as the telephone 12 or the wireless communication device 35. The system controller 22 encodes and schedules outbound messages such as a downlink call 34, for transmission by the radio frequency base transmitter 26 via a transmit antenna 30 to at least one wireless communication device 35 on at least one outbound radio frequency (RF) channel 32. As illustrated in FIG. 1, the wireless communication device 35 may be, for example, a cellular telephone or a pager. The downlink call 34 may be, for example, a data message, a voice message, or a telephone call. Similarly, the system controller 22 receives and decodes inbound messages such as an uplink call 44 received by the radio frequency base receiver 28 via a receive antenna 40 on at least one inbound RF channel 42 from the wireless communication device 35. The uplink call 44 may be, for example, a data message, a reply to a data message, a telephone call, or a reply to a telephone call.

It will be appreciated that the wireless communication system 10, in accordance with the present invention, may function utilizing any wireless RF channel, for example, a one or two way pager channel, a mobile cellular channel, or a mobile radio channel. Similarly, it will be appreciated that the wireless communication system 10 may function utilizing other types of channels such as infrared channels. In the following description, the term wireless communication system refers to any of the wireless communication systems mentioned above or an equivalent.

Similarly, it will be appreciated that the wireless communication device 35, in accordance with the present invention, may be a mobile cellular telephone, a mobile radio data terminal, a mobile cellular telephone having an attached data terminal, or a one or two way pager. In the following description, the term "wireless communication device" refers to any of the devices mentioned above or an equivalent.

Each wireless communication device 35 assigned for use in the wireless communication system 10 has an address assigned thereto which is a unique selective call address in the wireless communication system 10. The address enables the transmission of the downlink call 34 from the system controller 22 only to the wireless communication device 35 having that address, and identifies the messages and responses received at the system controller 22 from the wireless communication device 35. Furthermore, each wireless communication device 35 also has a pin number assigned thereto, the pin number being associated with a telephone number within the PSTN 18. A list of the assigned addresses and correlated telephone numbers for each wireless communication device 35 is stored in the system controller 22 in the form of a subscriber database 56.

Figure 2:
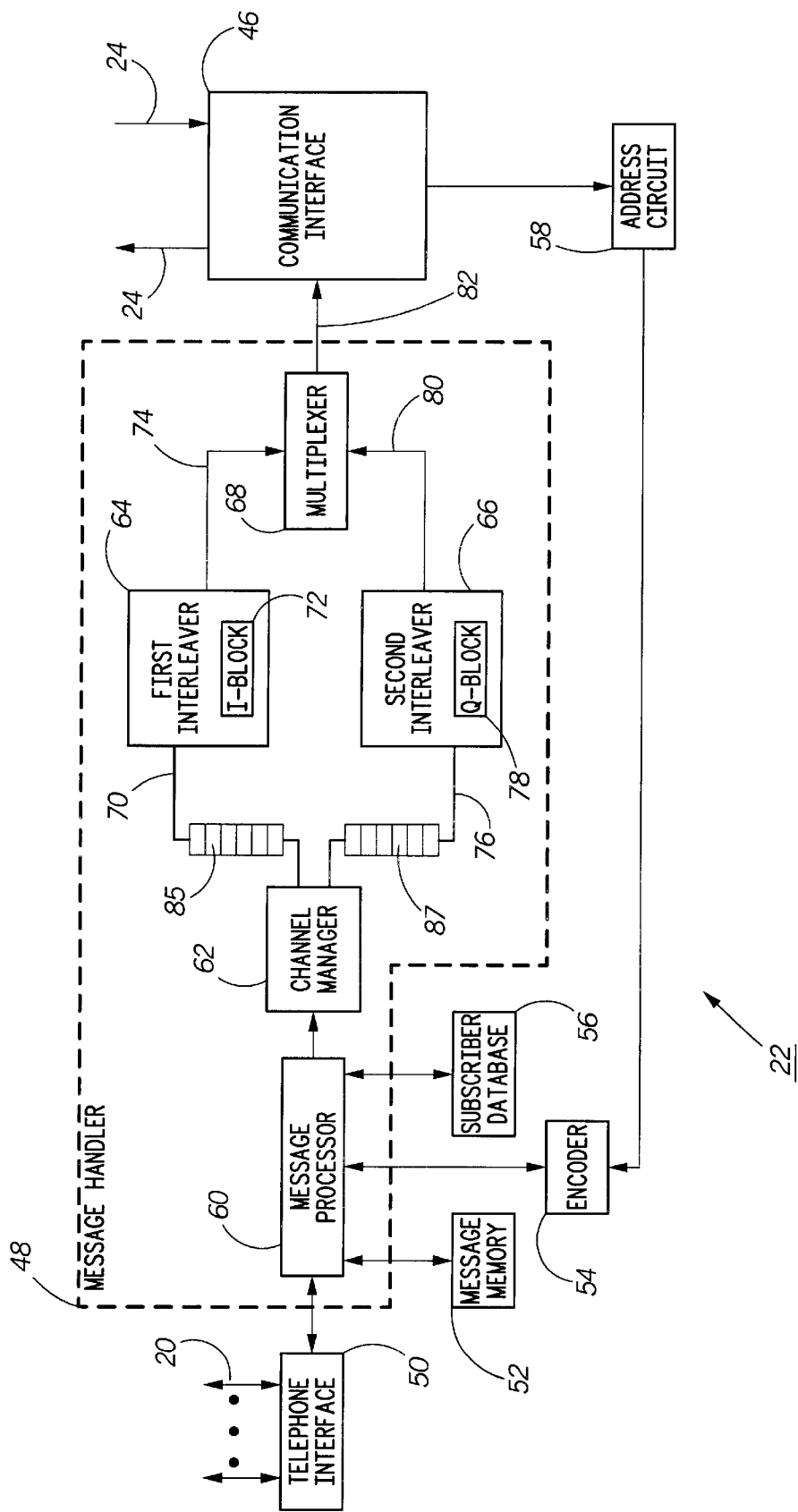
FIG. 2 is an electrical block diagram of a system controller for use within the wireless communication system of FIG. 1 in accordance with the present invention.

FIG. 2 is an electrical block diagram of the system controller 22 for use in the wireless communication system 10 of FIG. 1 in accordance with the preferred embodiment of the present invention. The system controller 22 comprises a communication interface 46, a message handler 48, a telephone interface 50, a message memory 52, an encoder 54, the subscriber database 56, and an address circuit 58.

The communication interface 46 queues data and stored voice messages for transmission to the wireless communication device 35, and receives acknowledgements, data responses, data messages, and telephone calls from the wireless communication device 35. The communication interface 46 is coupled to the radio frequency base transmitter 26 and the radio frequency base receiver 28 of FIG. 1 by the communication links 24.

The message handler 48, which routes and processes the messages, is coupled to the communication interface 46, and is further coupled to the telephone interface 50, message memory 52, the encoder 54, and the subscriber database 56. The telephone interface 50 handles the PSTN 18 (see FIG. 1) physical connection, connecting and disconnecting telephone calls at the telephone links 20, and routing the audio signals between the telephone links 20 and the message handler 48. The subscriber database 56 stores information for each subscriber. This subscriber information may include a correlation between the assigned address and the telephone number used within the PSTN 18 to route messages and telephone calls to each wireless communication device 35. It may also include other subscriber-defined preferences, such as hours during which messages are to be held back from delivery to the wireless communication device 35; and hours where the messages for the wireless communication device 35 are forwarded to a different device. The message memory 52 stores calls and replies in queue for scheduled delivery to the wireless communication device 35. The encoder 54 is coupled to the message handler 48 and the address circuit 58, and encodes messages intended for transmission to the wireless communication device 35.

Preferably, the message handler 48 comprises a message processor 60, a channel manager 62, a first interleaver 64, a second interleaver 66, and a multiplexer 68. The message processor 60 is coupled to and interfaces with the telephone interface 50, the message memory 52, the encoder 54 and the subscriber database 56 to process the calls and the messages. The call processing performed by the message processor 60 includes source encoding (such as digitizing voice messages) and error correction encoding. The channel manager 62 is coupled between the message processor 60 and the first and second interleavers (64, 66). The channel manager 62 assigns the calls received from the message processor 60 to either the first interleaver 64 or the second interleaver 66 in a pre-determined manner. Preferably, the channel manager 62 assigns the calls based on a preprogrammed algorithm. Alternatively, the calls received may include an instruction of channel assignment. One of ordinary skill in the art will recognize that other equivalent methods of channel assignment are within the scope of the present invention.

The first interleaver 64 interleaves a first set of calls 70 including a first call 85 received from the channel manager 62 into an I-channel interleaving block 72. The data in the I-channel interleaving block 72 is then output as an I-channel bit stream 74. The second interleaver 66 interleaves a second set of calls 76 including a second call 87 received from the channel manager 62 into a Q-channel interleaving block 78. The data in the Q-channel interleaving block 78 is then output as a Q-channel bit stream 80. The multiplexer 68 is coupled to the first interleaver 64 and the second interleaver 66 and multiplexes the I-channel bit stream 74 received from the first interleaver 64 and the Q-channel bit stream 80 received from the second interleaver 66 into a multiplexed bit stream 82, to be described below. The output of the multiplexer 68 is coupled to the communication interface 46. Upon receipt of the multiplexed bit stream 82 from the multiplexer 68, the communication interface 46 forwards the multiplexed bit stream 82 to the radio frequency base transmitter 26 (see FIG. 1) through the communication links 24. The radio frequency base transmitter 26 generates the downlink call 34 from the multiplexed bit stream 82 for transmission to the wireless communication device 35 over the outbound RF channel 32 via the transmit antenna 30.

The system controller 22 is preferably a EMX5000 switching terminal manufactured by Motorola Inc, of Schaumburg, Ill, modified with firmware elements in accordance with the preferred embodiment of the present invention, as described herein. The communication interface 46, the message handler 48, the message memory 52, the subscriber database 56, the encoder 54, the address circuit 58, and the telephone interface 50 are preferably implemented within portions of the EMX5000 switching terminal. These portions include, but are not limited to, those portions providing program memory, a central processing unit, input/output peripherals, and a random access memory. The system controller 22 alternatively could be implemented using a RF-Conductor! Model 3000 series network controller manufactured by Motorola Inc. of Schaumburg, Ill. The subscriber database 56 and the message memory 52 may alternatively be implemented as magnetic or optical disc memory, which may alternatively be external to the system controller 22. It will be appreciated by one of ordinary skill in the art that other similar terminals can be utilized for the system controller 22, and that additional infrastructure equipment of the same or alternative type can be added as required to handle the requirements of the system controller 22.

It should be noted that the system controller 22 is capable of operating in a distributed transmission control environment that allows the mixing of cellular, simulcast, master/slave, or other coverage schemes. Such an environment may include a plurality of radio frequency transmitters, radio frequency receivers, transmit antennas and receive antennas for providing reliable radio signals within a geographic area as large as a nationwide network. Moreover, one of ordinary skill in the art would recognize that the telephony and wireless communication system functions may reside in separate system controllers which operate either independently or in a networked fashion.

Figure 3:
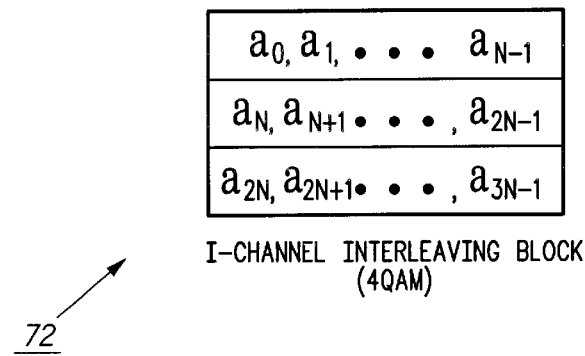
FIGS. 3 through 8 illustrate one embodiment of the various signals generated within the system controller of FIG. 2 utilizing a 4 QAM system.
Figure 4:
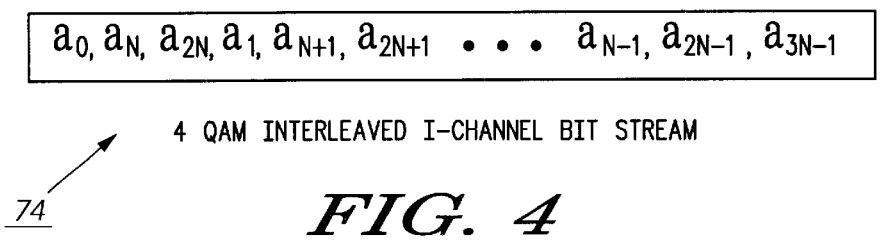
Figure 5:
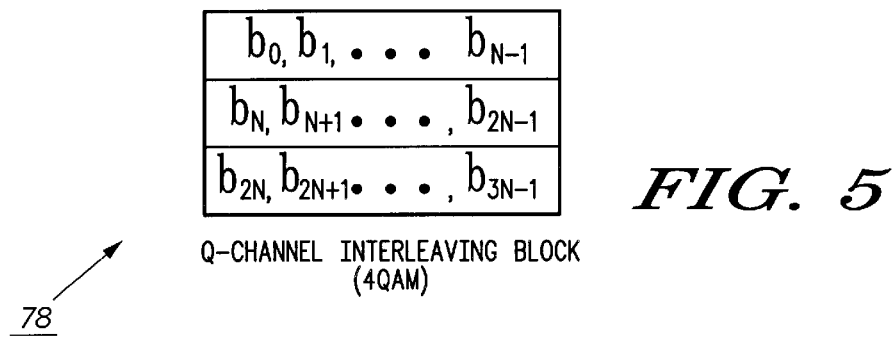
Figure 6:
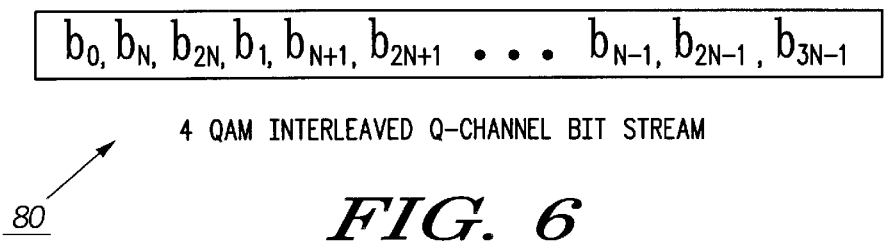
Figure 7:
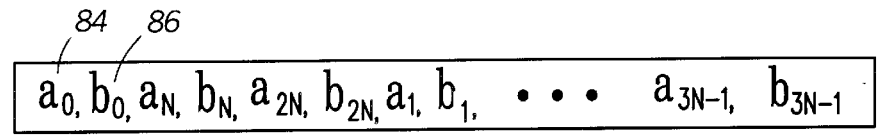

FIGS. 3 through 8 illustrate one embodiment, based on linear block coding and block interleaving with three codewords per interleaving block, of the various signals generated within the system controller of FIG. 2 utilizing 4 QAM modulation. One of ordinary skill in the art would recognize that quantities of codewords per interleaving block other than the illustrated example (three per interleaving block) are within the realm of the present invention. Referring to FIG. 2 for explanatory purposes, the system controller 22 receives two calls A and B. Call A is destined for a first wireless communication device and call B is destined for a second wireless communication device. The two calls are processed by the message processor 60 and then sent to the channel manager 62. The channel manager 62 sends call A to the first interleaver 64 and call B to the second interleaver 66. The first interleaver 64 then generates an I-channel interleaving block 72. FIG. 3 illustrates the I-channel interleaving block 72 generated by the first interleaver 64 for the first call A, whose elements are identified by the letter "a". The first interleaver 64 then generates the interleaved I-channel bit stream 74 from the I-channel interleaving block 72; and sends the interleaved I-channel bit stream 74 to the multiplexer 68. FIG. 4 illustrates the interleaved I-channel bit stream 74. The second interleaver 66 generates a Q-channel interleaving block 78. FIG. 5 illustrates the Q-channel interleaving block 78 generated by the second interleaver 66 for the second call B, whose elements are identified by the letter "b". The second interleaver 66 then generates the interleaved Q-channel bit stream 80 from the Q-channel interleaving block 78; and sends the interleaved Q-channel bit stream 80 to the multiplexer 68. FIG. 6 illustrates the interleaved Q-channel bit stream 80 that is sent utilizing the Q-channel interleaving block 78. The multiplexer 68 multiplexes the interleaved I-channel bit stream 74 and the interleaved Q-channel bit stream 80 to create the multiplexed bit stream 82. FIG. 7 illustrates the multiplexed bit stream 82. The multiplexed bit stream 82 is then communicated through the communication interface 46 by way of the communication links 24 to the radio frequency base transmitter 26. In the radio frequency base transmitter 26, the multiplexed bit stream 82 is converted into a complex symbol stream 83.

Figure 8:
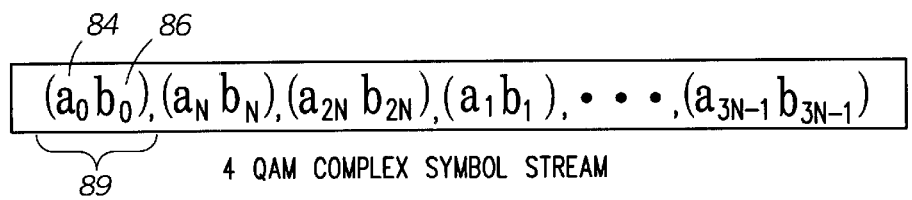

FIG. 8 illustrates the complex symbol stream 83. The complex symbol stream 83 is comprised of a plurality of symbols. As illustrated in FIG. 8, a symbol 89 of the complex symbol stream 83 is comprised of a first bit 84 from the first call 85 of the I-channel bit stream 74 paired with a second bit 86 from the second call 87 of the Q-channel bit stream 80. The complex symbol stream 83 is modulated onto the radio frequency carrier. The I-channel bits are used to modulate the in-phase component of the radio frequency carrier and the Q-channel bits are used to modulate the quadrature component of the radio frequency carrier. The modulated complex symbol stream is then sent to one or more wireless communication devices as the downlink call 34 (see FIG.1).

Separately interleaving the two calls for the I-channel and Q-channel accomplishes several things. First, the first wireless communication device listening to the first call 85 (call A) is required only to demodulate the I-channel portion of each received downlink call 34; and the second wireless communication device listening to the second call (call B) is required only to demodulate the Q-channel portion of the received downlink call 34.

In summary, separately interleaving calls, as described herein for the present invention, results in a simple algorithm and reduced processing in each wireless communication device. Separately interleaving reduces the requirement for the wireless communication device to fully demodulate both the I-channel and the Q-channel of a QAM channel. Lowering the demodulator overhead thereby improves battery life of the wireless communication device. Further, the burst error protection is improved over traditional methods by evenly distributing the errors across the two calls. This improvement increases the likelihood of error correction in the wireless communication device and therefore improves overall call quality.

Figure 9:
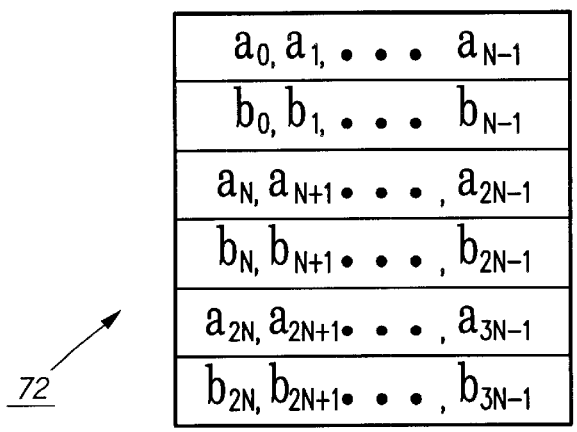
FIGS. 9 through 14 illustrate one embodiment of the various signals generated within the system controller of FIG. 2 utilizing a 16 QAM system.
Figure 10:
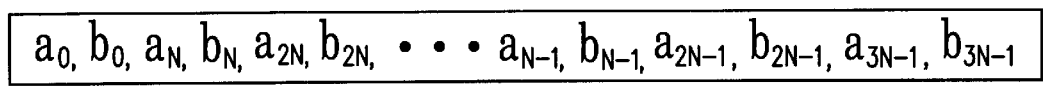
Figure 11:
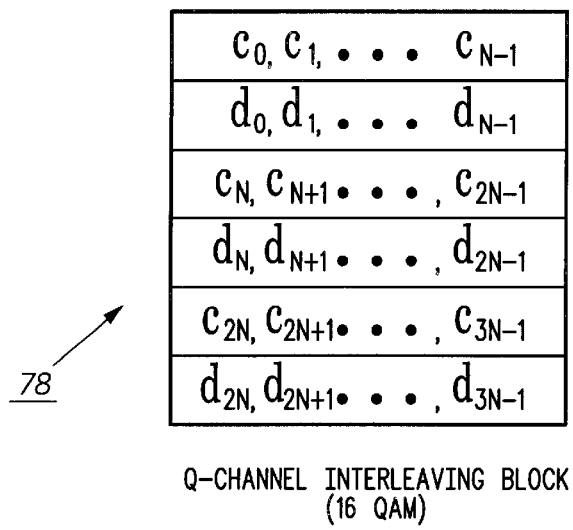
Figure 12:
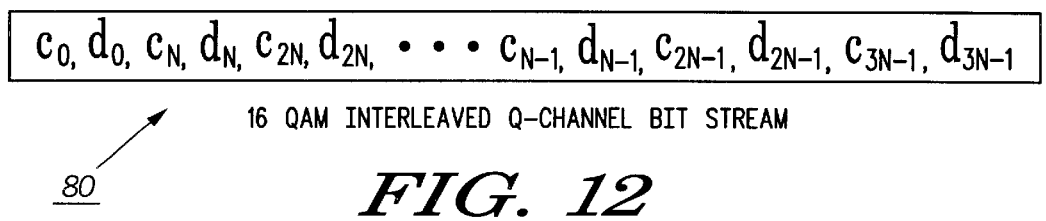
Figure 13:
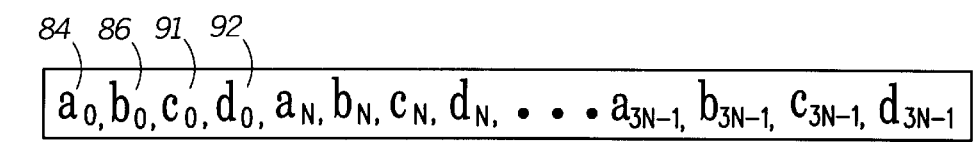

The preferred interleaving method of the present invention can be extended to higher order QAM cases as well. FIGS. 9 through 14 illustrate one embodiment, based on block coding and block interleaving with six codewords per interleaving block, of the various signals generated within the system controller 22 of FIG. 2 utilizing 16 QAM modulation. One of ordinary skill in the art would recognize that quantities of codewords per interleaving block other than the illustrated example (six per interleaving block) are within the realm of the present invention. Further, one of ordinary skill in the art will recognize that the described method of the present invention is easily extended further to higher orders of modulation such as 64 QAM and 256 QAM. In the example of 16 QAM, four calls, A, B, C, and D, are received by the system controller 22. The four calls may be destined for up to four different wireless communication devices in any combination. The four calls are processed by the message processor 60 and sent to the channel manager 62. The channel manager 62 sends calls A and B to the first interleaver 64 and sends calls C and D to the second interleaver 66. The first interleaver 64 generates the I-channel interleaving block 72 as illustrated in FIG. 9 for the first set of calls 70 (A and B). In FIG. 9, the elements for Call A are identified by the letter "a" and the elements of Call B are identified by the letter "b". The first interleaver 64 then generates the interleaved I-channel bit stream 74 from the I-channel interleaving block 72; and sends the interleaved I-channel bit stream 74 to the multiplexer 68. FIG. 10 illustrates the interleaved I-channel bit stream 74 for this 16 QAM modulation example. The second interleaver 66 generates the Q-channel interleaving block 78 as illustrated in FIG. 11 for the second set of calls 76 (C and D). In FIG. 11, the letter "c" identifies the elements of Call C and the letter "d" identifies the elements of Call D. The second interleaver 66 then generates the interleaved Q-channel bit stream 80 from the Q-channel interleaving block 78; and sends the interleaved Q-channel bit stream 80 to the multiplexer 68. FIG. 12 illustrates the interleaved Q-channel bit stream 80 for this 16 QAM modulation example. The multiplexer 68 multiplexes the interleaved I-channel bit stream 74 and the interleaved Q-channel bit stream 80 to create the multiplexed bit stream 82. FIG. 13 illustrates the multiplexed bit stream 82. The multiplexed bit stream 82 is then communicated through the communication interface 46 by way of the communication links 24 to the radio frequency base transmitter 26. In the radio frequency base transmitter 26, the multiplexed bit stream 82 is converted into a complex symbol stream 83.

Figure 14:
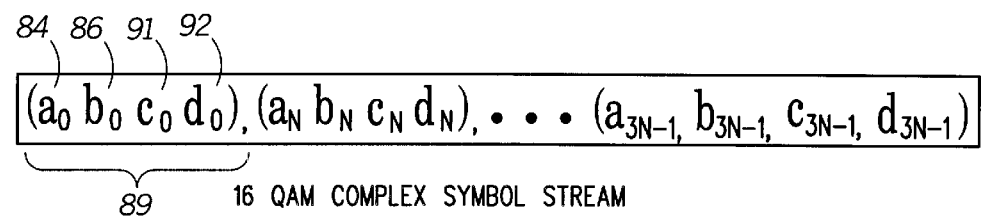

FIG. 14 illustrates the complex symbol stream 83. The complex symbol stream 83 is comprised of a plurality of symbols. As illustrated in FIG. 14, a symbol 89 of the complex symbol stream 83 is comprised of the first bit 84, the second bit 86, a third bit 91, and a fourth bit 92. The complex symbol stream 83 is modulated onto the radio frequency carrier. The I-channel bits are used to modulate the in-phase component of the radio frequency carrier and the Q-channel bits are used to modulate the quadrature component of the radio frequency carrier. The modulated complex symbol stream is then sent to one or more wireless communication devices as the downlink call 34 (see FIG.1).

Figure 15:
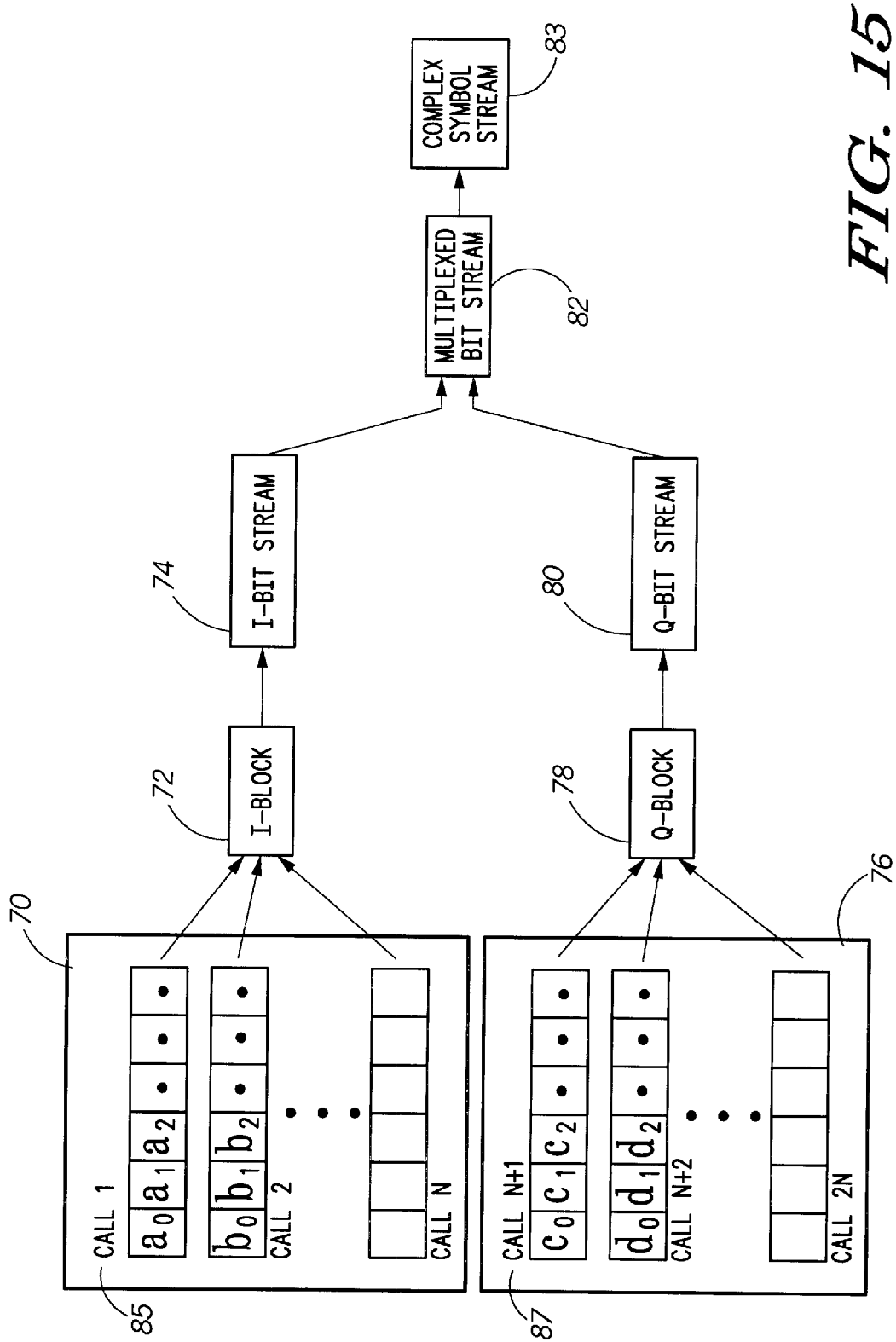
FIG. 15 illustrates the interaction of the various signals generated by the system controller of FIG. 2 in accordance with the present invention.

FIG. 15 summarizes the interaction of the various signals generated by the system controller 22 of FIG. 2 in accordance with the present invention. The first sets of calls 70 including the first call 85 are interleaved into the I-channel interleaving block 72. The second set of calls 76 including the second call 87 are interleaved into the Q-channel interleaving block 78.The data in the I-channel interleaving block 72 is output as the I-channel bit stream 74. The data in the Q-channel interleaving block 78 is output as the Q-channel bit stream 80. The I-channel bit stream 74 and the Q-channel bit stream 80 are then multiplexed together to form the multiplexed bit stream 82. The multiplexed bit stream 82 is converted into the complex symbol stream 83.

Figure 16:
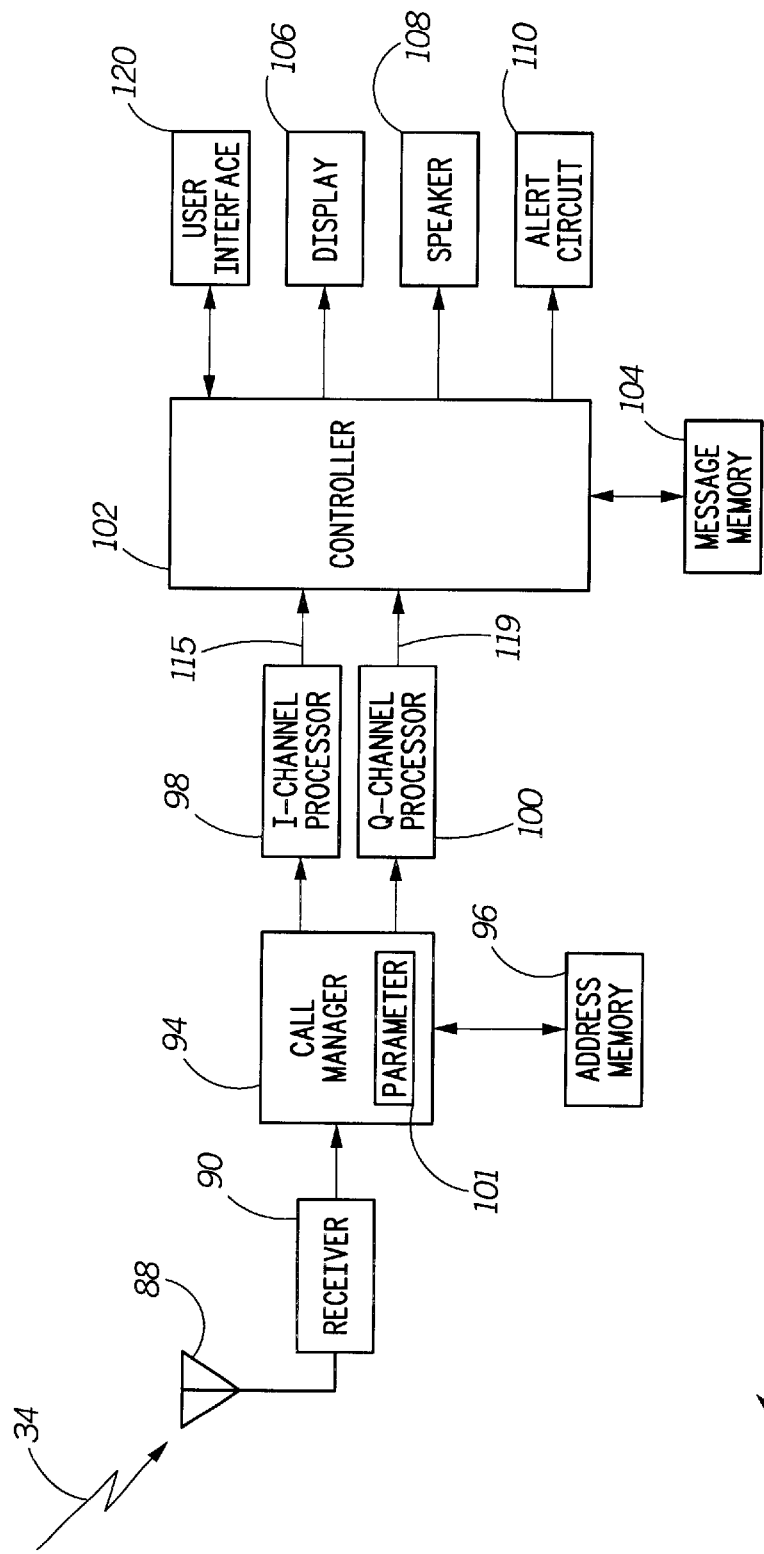
FIG. 16 is an electrical block diagram of a wireless communication device for use within the wireless communication system of FIG. 1 in accordance with the present invention.
Figure 17:
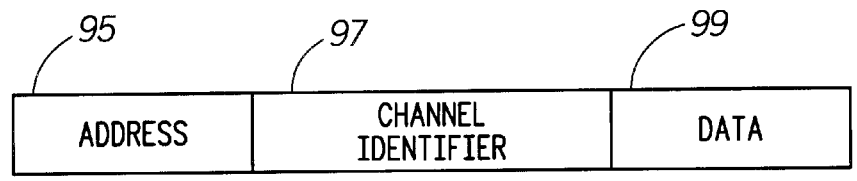
FIG. 17 illustrates a signal for communication within the wireless communication system of FIG. 1.

FIG. 16 is an electrical block diagram of the wireless communication device 35 for use within the wireless communication system 10 of FIG. 1 in accordance with the present invention. The wireless communication device 35 includes a first antenna 88 for receiving the downlink call 34 sent from the wireless communication system 10. The first antenna 88 is coupled to a receiver 90 employing conventional demodulation techniques for receiving communications from the wireless communication system 10. FIG. 17 illustrates one embodiment of the downlink call 34; wherein the downlink call 34 comprises an address 95, a channel identifier 97, and a data block 99. Those skilled in the art will recognize that the address 95 and the channel identifier 97 may alternatively be sent in a separate message prior to sending the data block 99 to the wireless communication device 35.

Referring back to FIG. 16, coupled to the receiver 90 is a call manager 94 utilizing conventional signal processing techniques for processing the downlink call 34. Preferably, the call manager 94 is similar to the MC68328 microcontroller manufactured by Motorola, Inc. of Schaumburg, Ill. It will be appreciated that other similar processors can be utilized for the call manager 94, and that additional processors of the same or alternative type can be added as required to handle the processing requirements of the call manager 94. The call manager 94 decodes the address 95 of the downlink call 34, compares the decoded address with one or more addresses stored in an address memory 96, and when a match is detected, proceeds to process the remaining portion of the downlink call 34. The call manager 94 next determines which portion of the downlink call 34 (the I-channel or Q-channel) contains the call destined for the wireless communication device 35. Preferably, the call manager 94 includes a channel parameter 101 that defines the channel of which the downlink call 34 is contained. Alternatively, the channel identifier 97 may be sent along with the data block 99 of the downlink call 34. One of ordinary skill in the art will recognize that other similar methods may be used to determine which channel contains the downlink call 34.

Coupled to the call manager 94 are an I-channel processor 98 and a Q-channel processor 100. The I-channel processor 98 receives the downlink call 34 from the call manager 94 when the call destined for the wireless communication device is contained within the I-channel bit stream 74 portion of the downlink call 34. The Q-channel processor 100 receives the downlink call 34 from the call manager 94 when the call destined for the wireless communication device 35 is contained within the Q-channel bit stream 80 portion of the downlink call 34. Preferably, the I-channel processor 98 and the Q-channel processor 100 are similar to the MC68328 micro-controller manufactured by Motorola, Inc. of Schaumburg, Ill. It will be appreciated that other similar processors can be utilized for the I-channel processor 98 and the Q-channel processor 100, and that additional processors of the same or alternative type can be added as required to handle the processing requirements of each of the two processors.

Figure 18:
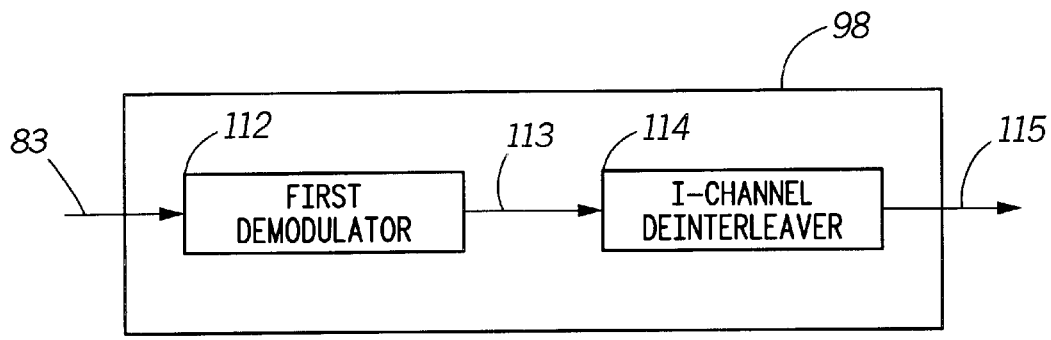
FIG. 18 is an electrical block diagram of an I-channel processor for use within the wireless communication device of FIG. 12.

FIG. 18 is an electrical block diagram of an I-channel processor 98 for use within the wireless communication device 35 of FIG. 16. Preferably, the I-channel processor 98 comprises a first demodulator 112 and an I-channel deinterleaver 114. The first demodulator 112 in one embodiment is a variable rate QAM demodulator for extracting the QAM modulation level from the complex symbol stream 83 of the downlink call 34; and demodulating the complex symbol stream 83 according to the QAM modulation level, thereby generating a first demodulated bit stream 113. Utilizing variable rate QAM demodulation facilitates scaling between different QAM modes. In another embodiment, the QAM modulation level is specified prior to demodulation. The I-channel deinterleaver 114 deinterleaves the first demodulated bit stream 113, generating an I-channel bit stream 115.

Figure 19:
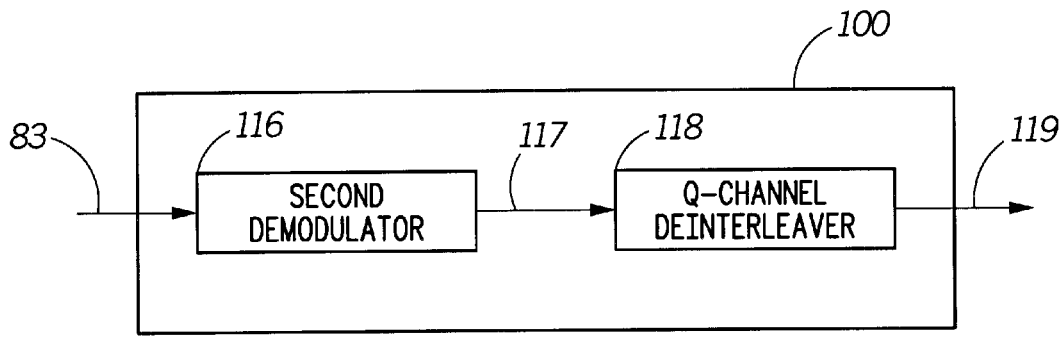
FIG. 19 is an electrical block diagram of a Q-channel processor for use within the wireless communication device of FIG. 12.

FIG. 19 is an electrical block diagram of a Q-channel processor 100 for use within the wireless communication device 35 of FIG. 16. Preferably, the Q-channel processor 100 comprises a second demodulator 116 and a Q-channel deinterleaver 118. The second demodulator 116 in one embodiment is a variable rate QAM demodulator, extracting the QAM modulation level from the complex symbol stream 83 of the downlink call 34; and demodulating the complex symbol stream 83 according to the QAM modulation level, thereby generating a second demodulated bit stream 117. Utilizing variable rate QAM demodulation facilitates scaling between different QAM modes. In another embodiment, the QAM modulation level is specified prior to demodulation. The Q-channel deinterleaver 118 deinterleaves the second demodulated bit stream 117, generating a Q-channel bit stream 119.

Referring back to FIG. 16, the I-channel processor 98 and the Q-channel processor 100 are coupled to a controller 102 for processing the I-channel bit stream 115 received from the I-channel processor 98 or the Q-channel bit stream 119 received from the Q-channel processor 100. Preferably, the controller 102 is similar to the MC68328 micro-controller manufactured by Motorola, Inc. of Schaumburg, Ill. It will be appreciated that other similar processors can be utilized for the controller 102, and that additional processors of the same or alternative type can be added as required to handle the processing requirements of the controller 102.

To perform the necessary functions of the wireless communication device 35, the controller 102 is coupled to a message memory 104 including a random access memory (RAM) and an electrically erasable programmable read-only memory (EEPROM). The controller 102 stores the I-channel bit stream 115 or the Q-channel bit stream 119 in the message memory 104.

The controller 102 preferably also sends a command to a display 106, coupled to the controller 102, to generate a visual notification of the storage of the I-channel bit stream 115 or the Q-channel bit stream 119. When the display 106 receives the command from the controller 102 that the I-channel bit stream 115 or the Q-channel bit stream 119 has been stored in the message memory 104, an indication is displayed. The indication, for example may be the activation of one of a plurality of icons on the display 106.

The controller 102 is further coupled to a user interface 120. The user interface 120 may provide a button press, a series of button presses, a voice response by the device user, or some other similar method of input by the device user. Selection via the user interface 120 of the indicator associated with the I-channel channel bit stream 115 or the Q-channel bit stream 119 displays the call on the display screen in the case of data messages. The display 106 may be, for example, a full or partial starburst liquid crystal display. It will be appreciated that other similar displays can be utilized for the display 106.

The controller 102 in one embodiment is coupled to a speaker 108. Selection via the user interface 120 of the indicator associated with the I-channel bit stream 115 or the Q-channel bit stream 119 annunciates the call on the speaker 108 in the case of voice messages. The speaker 108 preferably is driven from circuitry capable of producing both melodies and voice recordings.

In one embodiment, the wireless communication device 35 of FIG. 16 includes an alert circuit 110 coupled to the controller 102. The controller 102 sends a command to the alert circuit 110 to generate an alert notification of the storage of the I-channel bit stream 115 or the Q-channel bit stream 119. The alert circuit 110 may utilize a transducer for the generation of an audible alert or a vibrator for the generation of a vibratory alert. One of ordinary skill in the art will appreciate that other alternative alert mechanisms are within the scope of the present invention.

Figure 20:
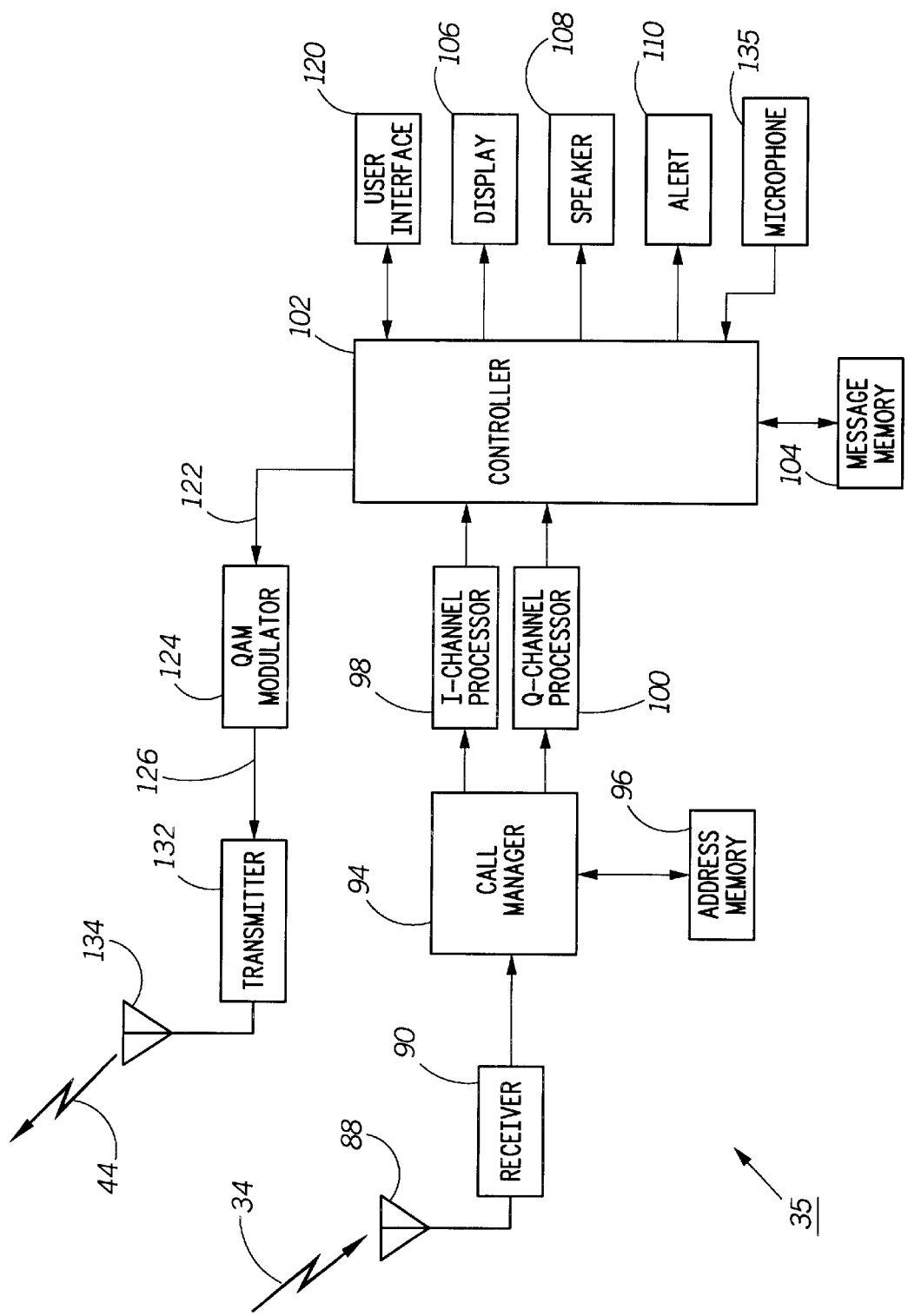
FIG. 20 is an electrical block diagram of an alternate embodiment of the wireless communication device of FIG. 12.

FIG. 20 is an electrical block diagram of an alternate embodiment of the wireless communication device 35 of FIG. 16 in accordance with the present invention. The reference numbers of the embodiment of FIG. 16 have been retained for those elements that are common. The wireless communication device 35 includes all the elements and functionality illustrated in FIG. 16 and previously described; and further comprises a QAM modulator 124, a transmitter 132, a second antenna 134, and a microphone 135.

In response to the user interface 120, the controller 102 generates a reply command 122. The QAM modulator 124 is coupled to the controller 102 and is responsive to the commands of the controller 102. Upon receipt of the reply command 122 from the controller 102, the QAM modulator 124 modulates the reply command 122 to generate a QAM call 126. The transmitter 132 is coupled to the QAM modulator 124. When the transmitter 132 receives the QAM call 126 from the QAM modulator 124, the transmitter 132 generates the uplink call 44 and sends the uplink call 44 via the second antenna 134 to the wireless communication system 10.

In one embodiment, the wireless communication device 35 of FIG. 20 includes the microphone 135 coupled to the controller 102. In response to a signal from the microphone 135, the controller 102 generates the reply command 122, initiating string of circuitry to generate and send the uplink call 44 via the second antenna 134 to the wireless communication system 10 as described above.

Figure 21:
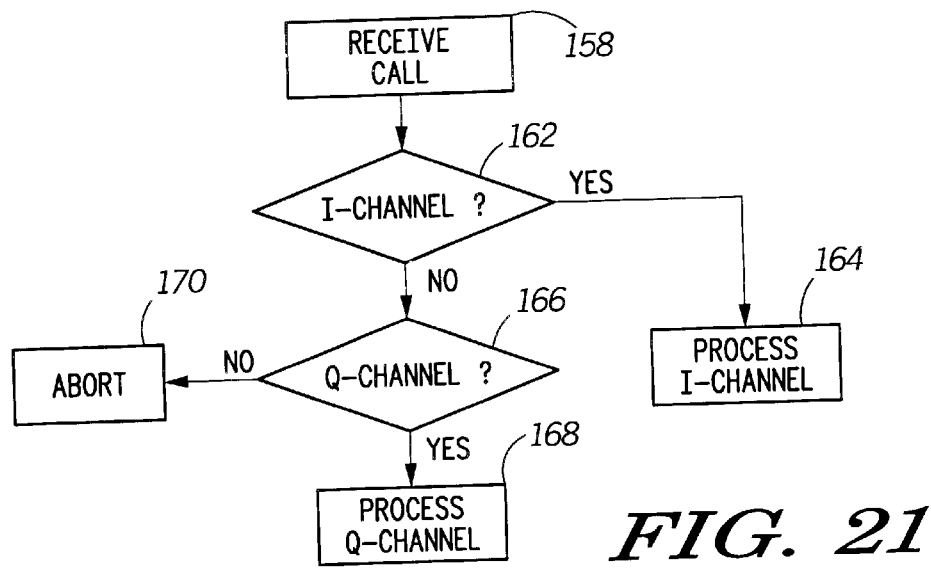
FIG. 21 is a flowchart illustrating the operation of the wireless communication device of FIG. 16.

FIG. 21 is a flowchart illustrating the operation of the wireless communication device 35 of FIG. 16. In Step 158, the wireless communication device 35 receives the downlink call 34 including the complex symbol stream 83 from the wireless communication system 10. In Step 162, the call manager 94 determines if the desired call is contained within the I-channel bit stream 74 of the complex symbol stream 83. When the desired call is contained within the I-channel bit stream 74, in Step 164 the I-channel processor 98 processes the I-channel portion of the downlink call 34. In Step 166, when the desired call is not contained within the I-channel bit stream 74, the call manager 94 checks if the desired call is contained within the Q-channel bit stream 80 of the complex symbol stream 83. In Step 168, when the desired call is contained within the Q-channel bit stream 80, the Q-channel processor 100 processes the Q-channel portion of the downlink call 34. In Step 170, when the downlink call 34 is not contained within the Q-channel bit stream 80, the processing of the downlink call 34 is aborted.

Figure 22:
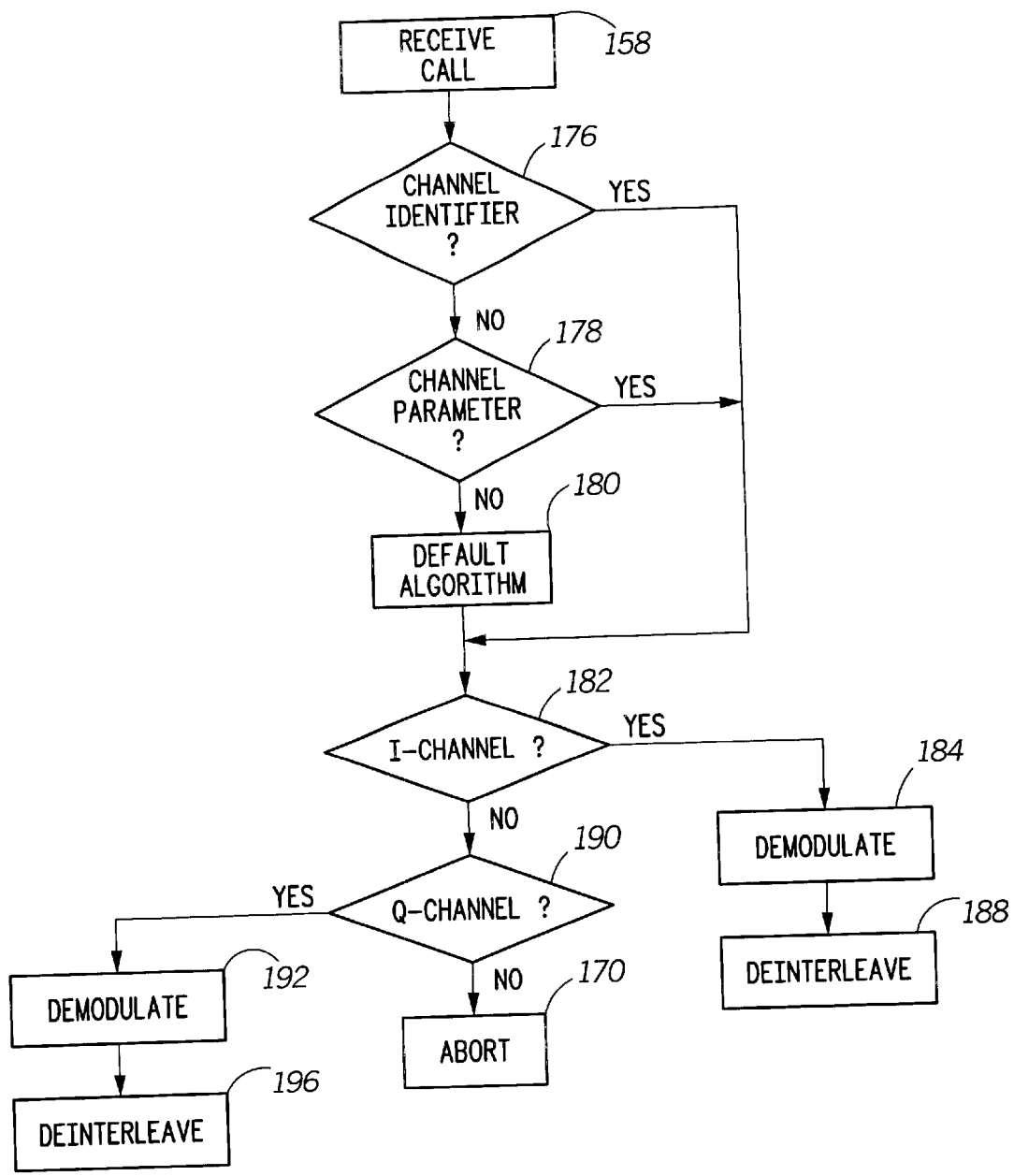
FIG. 22 is a flowchart illustrating more detail of one embodiment of the operation as illustrated in FIG. 21.

FIG. 22 is a flowchart illustrating more detail of the operation of the wireless communication device 35. In Step 158, the wireless communication device 35 receives the downlink call 34 including the complex symbol stream 83 from the wireless communication system 10. In Step 176, the call manager 94 checks the complex symbol stream 83 for the presence of the channel identifier 97. In Step 178, when no channel identifier 97 is detected in the complex symbol stream 83, the call manager 94 determines if it has been preprogrammed with the channel parameter 101. In Step 180, when no channel parameter 101 is detected, the call manager 94 implements a default algorithm. In Step 182, when the channel identifier 97, the channel parameter 101 or the default algorithm is detected, the call manager 94 determines whether the desired call is contained within the I-channel bit stream 74 based on the data contained therein. In Step 184, when the desired call is contained within the I-channel bit stream 74, the I-channel processor 98 demodulates the I-channel portion of the downlink call 34, generating the first demodulated bit stream 113. Next, in Step 188, the first demodulated bit stream 113 is deinterleaved, generating the I-channel bit stream 115. Referring back to Step 182, when the desired call is not contained within the I-channel bit stream 74, the call manager 94 checks if the desired call is contained within the Q-channel bit stream 80 in Step 190. In Step 170, when the desired call is not contained within the Q-channel bit stream 80, the processing is aborted. In Step 192, when the desired call is contained within the Q-channel bit stream 80, the Q-channel processor 100 demodulates the Q-channel portion of the downlink call 34, generating the second demodulated bit stream 117. Next, in Step 196, the second demodulated bit stream 117 is deinterleaved, generating the Q-channel bit stream 119.

Figure 23:
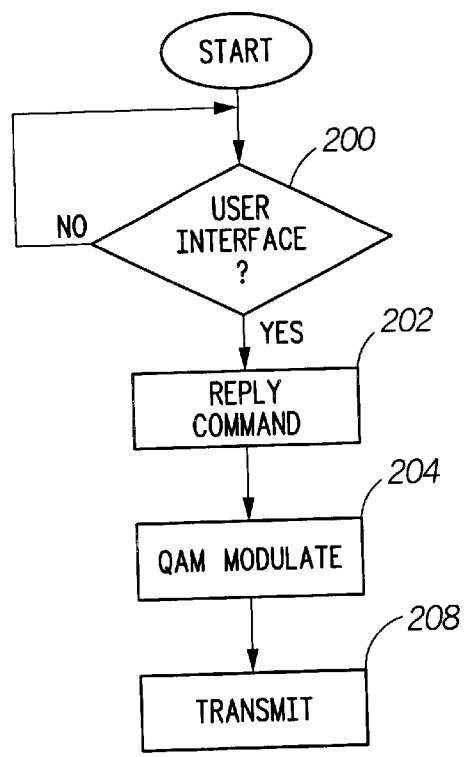
FIG. 23 is a flowchart illustrating the operation of the wireless communication device of FIG. 20.

FIG. 23 is a flowchart illustrating the further operation of the wireless communication device 35 of FIG. 20. In Step 200, the controller 102 checks for input from the user interface 120. When no user interface 120 is detected, the controller 102 continues periodically checking. In Step 202, when the user interface 120 is detected, the reply command 122 is sent from the controller 102 to the QAM modulator 124. In Step 204, the QAM modulator 124 modulates the reply command 122, generating the QAM call 126. Lastly, in Step 208, the transmitter 132 transmits the uplink call 44 generated from the QAM call 126 via the second antenna 134.

The method and apparatus for communicating a call herein described reduces the complexity of the implementation of variable rate QAM modulation between the base station transmitters and the wireless communication devices in a wireless communication system while preserving the burst error protection and overall improved call quality. This reduction in complexity reduces the processing requirement for the wireless communication device, thereby improving its battery life.

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. In a wireless communication system having a system controller, a radio frequency base transmitter, and at least one wireless communication device, a method employing quadrature amplitude modulation for communicating a downlink call between the radio frequency base transmitter and the wireless communication device, the method comprising:

interleaving a first set of calls, and generating an I-channel bit stream comprised of the interleaved first set of calls;

interleaving a second set of calls, and generating a Q-channel bit stream comprised of the interleaved second set of calls;

generating the downlink call by modulating the I-channel bit stream onto an in-phase carrier component of the downlink call and modulating the Q-channel bit stream onto a quadrature phase carrier component of the downlink call.

2. A method for communicating a downlink call between a radio frequency base transmitter and a wireless communication device as recited in claim 1 wherein the generating of the downlink call further comprises:

converting the modulated I-channel bit stream and Q-channel bit stream into a complex symbol stream.

3. A method for communicating a downlink call between a radio frequency base transmitter and a wireless communication device as recited in claim 2, wherein the I-channel bit stream includes a first bit from a first call and the Q-channel bit stream includes a second bit from a second call, and further wherein the converting step comprises generating a symbol by pairing the first bit and the second bit.

4. A method for communicating a downlink call between a radio frequency base transmitter and a wireless communication device as recited in claim 1 wherein the interleaving of the first set of calls comprises:

interleaving the first set of calls into an I-channel interleaving block; and generating the I-channel bit stream from the I-channel interleaving block.

5. A method for communicating a downlink call between a radio frequency base transmitter and a wireless communication device as recited in claim 1 wherein the interleaving of the first set of calls comprises:

interleaving the second set of calls into a Q-channel interleaving block; and generating the Q-channel bit stream from the Q-channel interleaving block.

6. A method for communicating a downlink call between a radio frequency base transmitter and a wireless communication device as recited in claim 1 further comprising:

transmitting the downlink call from the radio frequency base transmitter to the wireless communication device; and processing the downlink call within the wireless communication device.

7. A method for communicating a downlink call between a radio frequency base transmitter and a wireless communication device as recited in claim 6 whereby the processing step comprises:

receiving the downlink call; and processing the I-channel bit stream to retrieve the first set of calls.

8. A method for communicating a downlink call between a radio frequency base transmitter and a wireless communication device as recited in claim 6 whereby the processing step comprises:

receiving the downlink call; and processing the Q-channel bit stream to retrieve the second set of calls.

9. In a wireless communication system employing quadrature amplitude modulation for communicating a downlink call between a radio frequency base transmitter and at least one wireless communication device, a system controller for controlling the communication of the downlink call comprising:

a first interleaver, having an input and an output, for interleaving a first set of calls and generating an I-channel bit stream comprised of the interleaved first set of calls;

a second interleaver, having an input and an output, for interleaving a second set of calls and generating a Q-channel bit stream comprised of the interleaved second set of calls; and a multiplexer coupled to the output of the first interleaver and the output of the second interleaver for modulating the I-channel bit stream onto an in-phase carrier component of the downlink call and modulating the Q-channel bit stream onto a quadrature phase carrier component of the downlink call to generate the downlink call.

10. A system controller for controlling the communication of a downlink call between a radio frequency base transmitter and a wireless communication device as recited in claim 9 further comprising:

a channel manager coupled to the input of the first interleaver and the input of the second interleaver for assigning a first set of calls to the first interleaver and a second set of calls to the second interleaver.

11. In a wireless communication system employing quadrature amplitude modulation for communicating a downlink call between a radio frequency base transmitter and at least one wireless communication device, a system controller for controlling the communication of the downlink call comprising:

a message processor for processing a plurality of calls;

a channel manager coupled to the message processor, a first interleaver, and a second interleaver, for assigning a first set of calls to the first interleaver and a second set of calls to the second interleaver;

a first interleaver coupled to the channel manager, for interleaving the first set of calls received from the channel manager, and generating an I-channel bit stream comprised of the interleaved first set of calls;

a second interleaver coupled to the channel manager, for interleaving the second set of calls received from the channel manager, and generating a Q-channel bit stream comprised of the interleaved second set of calls;

a multiplexer for modulating the I-channel bit stream onto an in-phase carrier component of a multiplexed signal and modulating the Q-channel bit stream onto a quadrature phase carrier component of the multiplexed signal to generate the multiplexed signal; and a communication interface coupled to the multiplexer for receiving the multiplexed signal and generating the downlink call.

12. In a wireless communication system having at least one radio frequency base transmitter and employing quadrature amplitude modulation, a wireless communication device for receiving a downlink call from the radio frequency base transmitter, the wireless communication device comprising:

a receiver for receiving the downlink call including an I-channel bit stream modulated onto an in-phase carrier component of the downlink call and a Q-channel bit stream modulated onto a quadrature phase carrier component of the downlink call, wherein:
the I-channel bit stream comprises an interleaved first set of calls, and
the Q-channel bit stream comprises an interleaved second set of calls;

a call manager coupled to the receiver for routing the downlink call to an I-channel processor when the first set of calls includes a call destined for the wireless communication device; and the I-channel processor coupled to the call manager for processing the I-channel bit stream of the downlink call received from the call manager.

13. A wireless communication device for receiving a downlink call from a radio frequency base transmitter as recited in claim 12 wherein the I-channel processor comprises:

a first demodulator for demodulating the I-channel bit stream, and generating a first demodulated bit stream; and an I-channel deinterleaver coupled to the first demodulator, for receiving and deinterleaving the first demodulated bit stream.

14. A wireless communication device for receiving a downlink call from a radio frequency base transmitter as recited in claim 13, wherein the first demodulator comprises a variable rate QAM demodulator for extracting a QAM modulation level from the I-channel bit stream and demodulating the I-channel bit stream according to the extracted QAM modulation level.

15. A wireless communication device for receiving a downlink call from a radio frequency base transmitter as recited in claim 12 further comprising:

a Q-channel processor coupled to the call manager for processing the Q-channel bit stream of the downlink call received from the call manager, wherein the call manager routes the downlink call to the Q-channel processor when the second set of calls includes a call destined for the wireless communication device.

16. A wireless communication device for receiving a downlink call from a radio frequency base transmitter as recited in claim 15 wherein the Q-channel processor comprises:

a second demodulator for demodulating the Q-channel bit stream, and generating a second demodulated bit stream; and a Q-channel deinterleaver coupled to the second demodulator, for receiving and deinterleaving the second demodulated bit stream.

17. A wireless communication device for receiving a downlink call from a radio frequency base transmitter as recited in claim 16, wherein the second demodulator comprises a variable rate QAM demodulator for extracting a QAM modulation level from the Q-channel bit stream and demodulating the Q-channel bit stream according to the extracted QAM modulation level.

18. A wireless communication device as recited in claim 12 further comprising:

a QAM modulator for generating a QAM call; and a device transmitter coupled to the QAM modulator for transmitting the uplink call.

19. In a wireless communication device, a method for receiving a first set of calls from a wireless communication system employing QAM modulation techniques, the method comprising:

receiving a downlink call including an I-channel bit stream modulated onto an in-phase carrier component of the downlink call and a Q-channel bit stream modulated onto a quadrature phase carrier component of the downlink call; and processing the I-channel bit stream of the downlink call to retrieve the first set of calls when the first set of calls includes a call destined for the wireless communication device.

20. A method as recited in claim 19 wherein the processing step comprises:

demodulating the I-channel bit stream, and generating a first demodulated bit stream; and deinterleaving the first demodulated bit stream, and retrieving the first set of calls.

21. A method as recited in claim 20 wherein the demodulating step comprises extracting the QAM modulation level from the I-channel bit stream, and demodulating the I-channel bit stream according to the QAM modulation level.

22. A method as recited in claim 21 further comprising:
identifying that the first set of calls are contained within the I-channel bit stream before the processing step.

23. In a wireless communication device, a method for receiving a second set of calls from a wireless communication system employing QAM modulation techniques, the method comprising:
receiving a downlink call including an I-channel bit stream modulated onto an in-phase carrier component of the downlink call and a Q-channel bit stream modulated onto a quadrature phase carrier component of the downlink call; and
processing the Q-channel bit stream of the downlink call to retrieve the second set of calls when the second set of calls includes a call destined for the wireless communication device.

24. A method as recited in claim 23 wherein the processing step comprises:
demodulating the Q-channel bit stream, and generating a second demodulated bit stream; and
deinterleaving the second demodulated bit stream, and retrieving the second set of calls.

25. A method as recited in claim 24 wherein the demodulating step comprises: extracting the QAM modulation level from the Q-channel bit stream, and demodulating the Q-channel bit stream according to the QAM modulation level.

26. A method as recited in claim 23 further comprising:
identifying that the second set of calls are contained within the Q-channel bit stream before the processing step.

27. In a wireless communication device, a method for receiving a first set of calls and a second set of calls from a wireless communication system employing QAM modulation techniques, the method comprising:
receiving a downlink call including an I-channel bit stream modulated onto an in-phase carrier component of the downlink call and a Q-channel bit stream modulated onto a quadrature phase carrier component of the downlink call;
identifying that the first set of calls are contained within the I-channel bit stream;
identifying that the second set of calls are contained within the Q-channel bit stream;
processing the I-channel bit stream of the downlink call to retrieve the first set of calls; and
processing the Q-channel bit stream of the downlink call to retrieve the second set of calls.

* * * * *